Feb. 7, 1939.　　　　　E. MILLER　　　　　2,146,482
EMERGENCY STOP FOR GLASSWARE MAKING MACHINES
Original Filed March 21, 1933
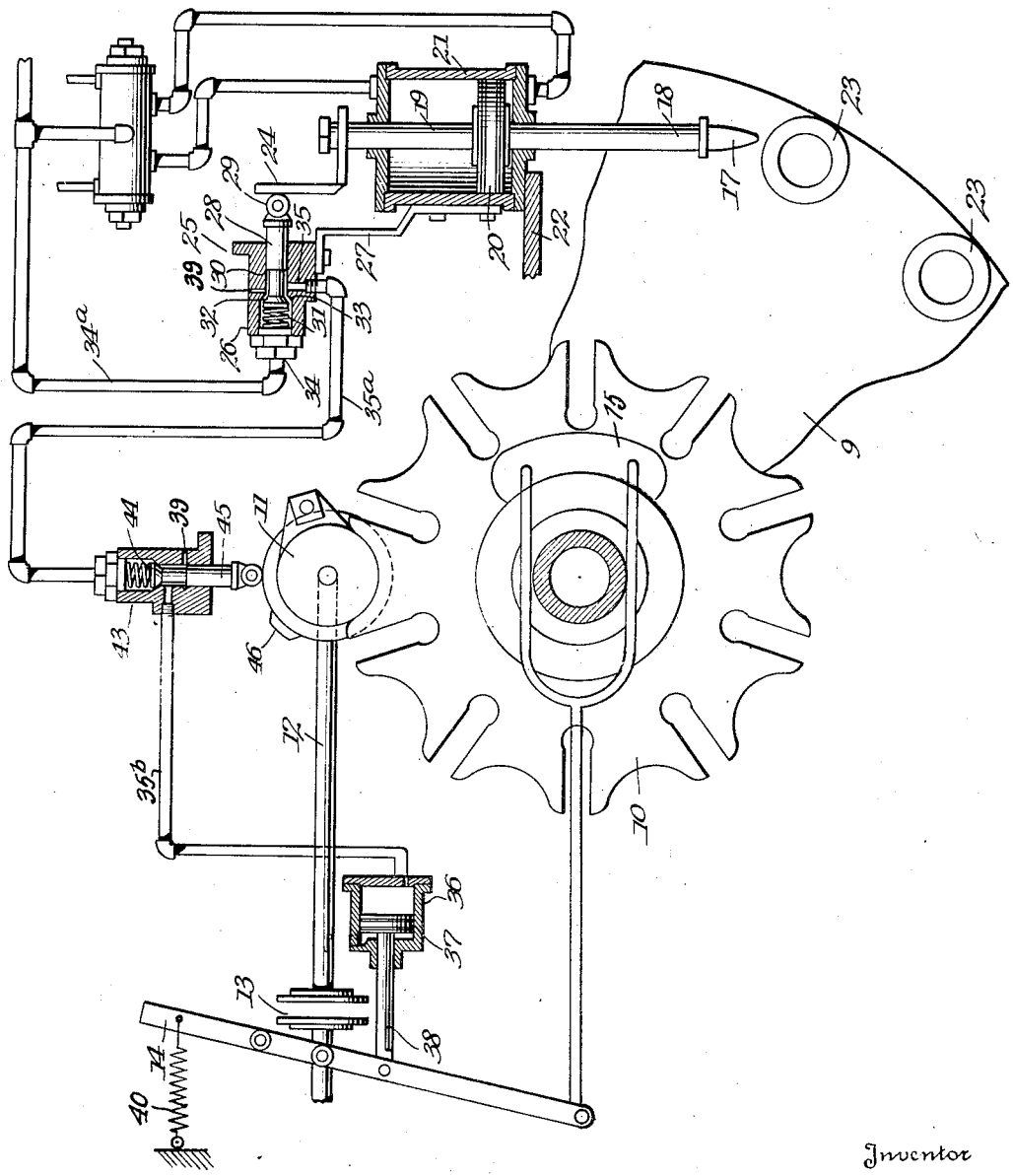
Inventor
Edward Miller Patented Feb. 7, 1939

2,146,482

UNITED STATES PATENT OFFICE

2,146,482

EMERGENCY STOP FOR GLASSWARE MAKING MACHINES

Edward Miller, Columbus, Ohio, assignor to Lynch Corporation, a corporation of Indiana Continuation of application Serial No. 661,915, March 21, 1933. This application July 3, 1935, Serial No. 29,697

10 Claims. (Cl. 49—9)

The present invention relates to improvements in glassware forming machines of the type employing fluid pressure operated devices for fabricating or handling of the ware, and aims to improve existing machines of that type.

Most glassware forming machines include, as a part of their mechanism, certain bodily movable elements or mechanisms, such as reciprocating plunger mechanism, blow heads, transfer or take-out members and the like. In many machines one or more of these elements or mechanism are operated by a reciprocable fluid pressure operated motor. One of the principal aims and objects of the invention is the provision of a simple and efficient safety mechanism arranged to prevent operation of the machine until such fluid pressure operated bodily movable member has completed its movement and has returned to a position that it will not be jammed during operation of the machine.

In the accompanying drawing, I have illustrated one application of my invention to a glass-working machine, and for purposes of illustration I have shown other improvements applied to a rotary machine of the press and blow type. The drawing, therefore, is diagrammatic, parts being shown in plan and parts in section, better to illustrate one preferred construction.

By way of illustration, the invention is shown applied to a rotary pressing and blowing machine comprising a rotary mold carrier 9 driven by suitable means, as for example, by an intermittent driving mechanism, comprising a Geneva gear 10 rotated by a rotor 11, suitably driven from a main drive shaft 12. The drive shaft advantageously may include a clutch 13 operable by means of a clutch lever 14 and a brake 15 to check the shaft and table against rotation when the clutch is disengaged. It is to be understood that the particular details of the mold carrier driving or indexing mechanism is not essential to the broad features of the invention, but merely illustrate one suitable driving mechanism for the purpose.

As stated above, glassware forming machines usually include mechanisms or members bodily movable toward or from the molds or other parts of the machine, as for example; the pressing plunger, the blowing heads, transfer and take-out tongs, mold clamp and the like. It is obviously important in the intermittently rotated machine, that the molds not be indexed while any of these mechanisms are in the path of the molds or other parts carried by the mold carrier, otherwise damage to the machine may occur. Accordingly I provide mechanism operative to prevent mold carrier movement, which in the illustrated embodiment of the invention, may control the clutch 13, in the event one of the bodily movable elements or mechanisms, as for example, the pressing punger, fails to return to its inactive position.

In the illustrated embodiment, the body movable member or mechanism is illustrated as a pressing plunger 17, on the lower end of a rod 18, suitably connected to a piston rod 19 of a piston 20 reciprocable in a cylinder 21 supported upon a suitable support or standard 22 from a fixed part of the machine. Air under pressure may be alternately admitted to opposite ends of the cylinder 21, as is usual, to reciprocate the plunger 17 into and out of operative engagement with the mold 23, as is customary and well understood.

The bodily movable member, that is, the pressing plunger, in the illustrated example, carries an abutment or cam member 24, which may be mounted on some movable part thereof, as for example, the piston rod 19, which is adapted to engage, during operative position of the member 17, an emergency safety device 25 adapted during operation or working position of the member 17, to render the mold carrier driving or indexing mechanism inoperative.

One suitable type of safety device comprises a valve casing 26, which may be mounted upon a bracket 27 supported upon the support or standard 22 and provided with a reciprocatory valve stem 28 therein carrying a roller 29 at its outer end adapted to be engaged by the abutment or cam member 24. The valve casing 26 is bored throughout its length as at 30, to form a guide for the stem 28 and at one end the bore is enlarged as at 31 to receive the head 32 of the valve stem 28, there being a valve seat 33 formed where the bores 30 and 31 join. The casing 26 is provided at one side of the seat 33 with an air inlet port 34 adapted to receive, through line 34ª constant or main pressure air, and on the opposite side of the seat there is a port 35 to which is connected air line 35ª, adapted to deliver, during working position of the member 17, air under pressure to a cylinder 36 to move a piston 37 therein, the piston rod 38 of which is connected to the clutch lever 14 to disengage the clutch 13 and apply the brake 15, thus rendering the driving mechanism for the mold carrier inoperative during working position of the member 17.

Obviously as long as the several movable elements or mechanisms 17 function properly and are in their inoperative positions at the time of indexing the mold carrier, there is no necessity for the repeated unclutching and clutching of the driving mechanism. To avoid such excessive wear upon the clutch and driving mechanism I provide means interposed in the connections between the safety device 25 and the cylinder 36 which will render the piston 37 for clutching and unclutching the drive mechanism operative only in case the element or mechanism 17 is stuck in the working position at the instant the mold carrier is to be indexed.

One suitable example of such means is a valve in the line 35ª, the inlet port of said valve casing 43 being connected to the portion of the line 35ª connected to the valve casing 25 and the outlet port of the valve casing 43 being connected to the cylinder 36. This valve casing 43 is preferably fitted with a spring pressed valve 44 acting normally to close the valve and prevent the flow of air to the cylinder 36. The stem 45 of the valve 44 may extend through the casing 43 to be engaged by an abutment on a timer, as for example, a cam 46 on the Geneva rotor 11, and timed to open the valve 44 just prior to the positioning of the rotor ready for indexing the mold carrier.

Thus in operation of the device as the rotor 11 is rotated to a position ready for indexing, or mold carrier operation the cam 46 lifts the valve stem 45 to open the valve 44. In this position, if all of the movable elements or mechanism 17 have been fully returned to their inoperative position, there will not be any air pressure in line 35ª as the respective valves 28 are closed and hence there will be no operation of the piston 37 and interruption in the driving mechanism for the mold carrier. If, however, at such moment, one of the elements 17 is stuck in its lowered position or has not fully returned to its inoperative position, the valve head 32 being unseated, will allow air under pressure to flow through line 35ª, through raised valve 44 to cylinder 36 to actuate the piston 37 and disengage the clutch. When the defective element 17 has been restored to its inoperative position, the valve head 32 engages the seat 33 and shuts off the supply of pressure air from line 34ª and 35ª, permitting air in lines 35ª and 35ᵇ to exhaust through exhaust ports 39, permitting the automatic shifting of the clutch lever 14, by suitable means, as for example, a spring 40, and the reclutching of the mold carrier driving mechanism. During the open position of the valve 32 an enlarged portion of the valve stem closes the exhaust ports 39 so that full air pressure is available for the actuation of piston 37 to disengage the clutch and apply the brake 15.

It is to be understood that the construction above described and shown in the accompanying drawing is intended for illustrative purposes only and that many changes and variations may be made without departing from the spirit of my invention.

This application is a continuation of my application Serial No. 661,915, filed March 21, 1933.

I claim:

1. In a glassworking machine including a revoluble mold carrier, power means including a clutch for intermittently moving said carrier to present the molds successively to a stationary working position, a movable device mounted adjacent said mold at said stationary working position, means for moving said device toward and from said mold, pneumatically operated means for actuating said clutch, and valve means mounted adjacent said movable device and operable thereby during each movement of the device toward a mold, for controlling the operation of said pneumatically operated clutch actuating means.

2. In a glassworking machine including a revoluble mold carrier, power means including a clutch for intermittently moving said carrier to present the molds successively to a stationary working position, a movable device mounted adjacent said mold at said stationary working position, means for moving said device toward and from said mold, pneumatically operated means for actuating said clutch, valve means mounted adjacent said movable device and operable thereby during movement of the device toward a mold, for controlling the operation of said pneumatically operated clutch actuating means, and means connected to said valve means and pneumatically operated clutch actuating means for preventing actuation of the clutch except at times preparatory to the movement of the mold carrier.

3. In a glassworking machine including a revoluble mold carrier, power means including a clutch for intermittently moving said carrier to present the molds successively to a stationary working position, a movable device mounted adjacent said mold at said stationary working position, means for moving said device toward and from said mold, pneumatically operated means for actuating said clutch, a valve actuating member carried by said movable device, a valve mounted adjacent said device and arranged to be actuated by said member to open position during each movement of said device toward said mold, and air connections between said valve and pneumatically operated clutch actuating means, said valve being arranged to admit air under pressure through said connection to said clutch actuating means upon being opened by said actuating member, while said device is in cooperative working position with a mold.

4. In a glassworking machine including a revoluble mold carrier, power means including a clutch for intermittently moving said carrier to present the molds successively to a stationary working position, a movable device mounted adjacent said mold at said stationary working position, means for moving said device toward and from said mold, pneumatically operated means actuating said clutch, a valve actuating cam carried by and movable with said movable device, a valve arranged to be operated by said cam during all times when the device is moved toward and in cooperative working position with respect to the mold, air connections between said valve and clutch actuating means, and means for supplying constant air pressure to said valve, said valve when opened being arranged to admit air under pressure through said connections to said clutch actuating means.

5. In a glassworking machine including a revoluble mold carrier, power means including a clutch for intermittently indexing said carrier to present the molds successively to a stationary working position, a movable device mounted adjacent said mold at said stationary working position, means for moving said device toward and from said mold, pneumatically operated means for actuating said clutch, a valve actuating memmer carried by said movable device, a valve mounted adjacent said device and arranged to be actuated by said member to open position, air connections between said valve and pneumatically operated clutch actuating means, said valve being arranged to admit air under pressure through said connections to said clutch actuating means upon being opened by said actuating member, and means interposed in said air connections for interrupting the flow of air to said clutch actuating means except at times preparatory to the indexing movement of the mold carrier.

6. In a glassworking machine including a revoluble mold carrier, power means including a clutch for intermittently indexing said carrier to present the molds successively to a stationary working position, a movable device mounted adjacent said mold at said stationary working position, means for moving said device toward and from said mold, pneumatically operated means for actuating said clutch, a valve actuating member carried by said movable device, a valve mounted adjacent said device and arranged to be actuated by said member, to open position, air connections between said valve and pneumatically operated clutch actuating means, said valve being arranged to admit air under pressure through said connection to said clutch actuating means upon being opened by said actuating member, and means interposed in said connections for interrupting the flow of air to said clutch actuating means except when the valve is opened at a time preparatory to the indexing movement of the mold carrier.

7. In a glassworking machine including a revoluble mold carrier, power means including a clutch for intermittently indexing said carrier to present the molds successively to a stationary working position, a movable device mounted adjacent said mold at said stationary working position, means for moving said device toward and from said mold, pneumatically operated means for actuating said clutch, a valve actuating member carried by said movable device, a valve mounted adjacent said device and arranged to be actuated by said member to open position, air connections between said valve and pneumatically operated clutch actuating means, said valve being arranged to admit air under pressure through said connections to said clutch actuating means upon being opened by said actuating member, and a spring-pressed valve interposed in said connections for interrupting the flow of air to said clutch actuating means except when the valve is opened at a time preparatory to the indexing movement of the mold carrier.

8. In a glassworking machine including a revoluble mold carrier, power means including a clutch for intermittently indexing said carrier to present the molds successively to a stationary working position, a movable device mounted adjacent said mold at said stationary working position, means for moving said device toward and from said mold, pneumatically operated means for actuating said clutch, a valve actuating member carried by said movable device, a valve mounted adjacent said device and arranged to be actuated by said member to open position, air connections between said valve and pneumatically operated clutch actuating means, said valve being arranged to admit air under pressure through said connections to said clutch actuating means upon being opened by said actuating member, valve means interposed in said air connections and arranged normally to interrupt the flow of air under pressure to said clutch actuating means, and means for opening said last named valve means preparatory to an indexing movement of the mold carrier.

9. In a glassworking machine including a revoluble mold carrier, power means including a clutch for intermittently indexing said carrier to present the molds successively to a stationary working position, a movable device mounted adjacent said mold at said stationary working position, means for moving said device toward and from said mold, pneumatically operated means for actuating said clutch, a valve actuating member carried by said movable device, a valve mounted adjacent said device and arranged to be actuated by said member, to open position, air connections between said valve and pneumatically operated clutch actuating means, said valve being arranged to admit air under pressure through said connection to said clutch actuating means upon being opened by said actuating member, valve means interposed in said air connections and arranged normally to interrupt the flow of air under pressure to said clutch actuating means, and a timer operating in synchronism with said mold moving means for opening said last named valve means preparatory to an indexing movement of the mold carrier.

10. In a glassware forming machine in combination with a mold carrier, and means for intermittently moving said mold carrier to present the molds thereon successively to a stationary working position, said means including a clutch and a constantly rotating part, a movable device at the stationary working position and means for moving said device toward and away from the mold, of pneumatically operated means for actuating said clutch, a normally closed valve mounted adjacent said movable device and actuated thereby to open position when said device is moved toward a mold, means for supplying air under pressure to said valve, and air connections between said valve and clutch actuating means for conducting air under pressure to the latter when the valve is opened by said movable device, a normally closed valve in said air connections for interrupting the flow of air under pressure therein to said clutch actuating means, and means controlled by said constantly rotating part for opening said last named valve preparatory to an indexing movement of said mold carrier.

EDWARD MILLER.